3,113,846
TITANIUM CERAMIC COMPOSITE BODIES
John G. Leschen, Schenectady, N.Y., assignor to General Electric Company, a corporation of New York
Filed May 31, 1962, Ser. No. 198,941
2 Claims. (Cl. 29—195)

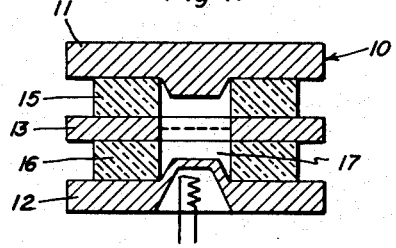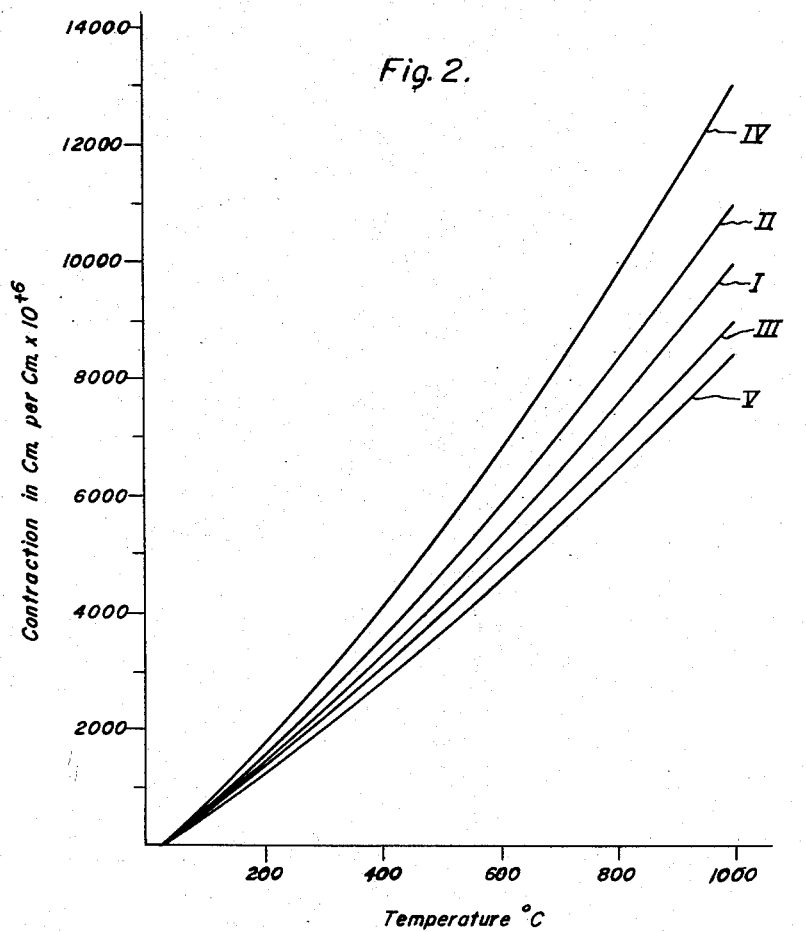

The present invention relates generally to ceramic-metal composites and is more particularly concerned with novel composite structures comprising magnesia and magnesia-alumina spinel bodies vacuum-tightly bonded to titanium metal bodies.

In the manufacture of electronic apparatus such as specialty vacuum tubes and some types of thermionic converters, metal-ceramic combinations including titanium are often provided as envelopes. At operating temperatures below 500° C. to 600° C., there are a number of ceramic compositions which have for some time been known in the art as being compatible with titanium and thus suitable for this purpose. At the same time, however, it has long been recognized that the substantial silica content of these compositions is deleterious at higher temperatures in that an oxide cathode poisoning effect results when silica is present and leads to drastic reduction of electron emission. Thus, even though the material advantages of higher temperature operation were fully appreciated, the operating temperature limitation imposed by the presence of silica has been accepted down to the present time as there has previously been no successful effort to find an answer to the problem of eliminating the silica while retaining all the essential and desirable physical characteristics of the titanium-matching, silica-containing ceramics.

It is, accordingly, a primary object of the present invention to provide a ceramic material which could be used with titanium metal to produce a vacuum tube envelope free from the important shortcomings, derelictions and limitations of prior composite bodies of this general type.

It is a further important object of this invention to provide an envelope which meets the aforesaid high temperature operation requirements and would at the same time be easy and economical to produce and would have the physical strength characteristics required for practical service in electron tube and thermionic converter applications.

Additional objects of this invention and special advantages of these new composite bodies will become apparent to those skilled in the art upon consideration of the detailed description set out below, taken in conjunction with the drawings accompanying and forming a part of this specification, in which:

FIG. 1 is a sectional semi-schematic view of a vacuum tube in which ceramic elements are permanently bonded to titanium elements in a preferred embodiment; and FIG. 2 is a chart bearing curves showing the linear contraction characteristics of titanium metal and of several of my new ceramic bodies.

Briefly described, a composite body of this invention comprises a body of substantially pure titanium permanently joined to a crystalline ceramic body by means of a soldered joint forming a vacuum-tight bond. The ceramic body consists essentially of a fired mixture of magnesia and magnesia-alumina spinel within certain compositional limits, which is substantially silica-free and has a coefficient of thermal expansion between 25° C. and 1000° C. between about 9.0 and $11.0 \times 10^{-6}$ centimeter per centimeter per degree C. More specifically, in the preferred form of the invention, this ceramic body contains 50 parts of magnesia and 50 parts of magnesia-alumina spinal and has a coefficient of thermal expansion over the aforesaid range of $10.0 \times 10^{-6}$ centimeter per centimeter per degree C. Thus, in this case, the ceramic body is virtually a perfect thermal expansion and contraction match to the titanium body over the range from room temperature to 1000° C. As in the general case defined above, however, in this preferred composite body no electrically conducting film is produced either in the course of its production or during use.

A ceramic composition use in the production of these new bodies may be prepared by mixing, in accordance with standard ceramic techniques, a spinel powder and magnesia powder in the required proportions, pressing the resulting substantially homogeneous mixture into a blank suitable for machining to the form desired in ultimate use, and firing in air at 1700° C. to 1800° C. for an hour to sinter them. Alternatively, the powder mixtures may be subjected to a hot pressing operation to obtain the results of this sintering operation.

With reference to the drawings, an electronic tube 10 is made by combining in a cathode-anode-grid assembly a pair of washer-like elements as insulators and spacers between the electrical components of the assembly. Thus, as shown in FIG. 1, tube 10 comprises an anode 11, a cathode 12 and a grid 13, all of substantially pure titanium, and spacers 15 and 16 of the ceramic composition above described. The ceramic elements 15 and 16 are disposed between the anode and grid and between the grid and the cathode, respectively, and a closed chamber 17 is provided in the tube by virtue of the fact that the disk-like anode and cathode close the top and bottom of the open-ended cylinder defined by the washer-like parts including grid 13 and ceramic elements 15 and 16.

The metallic members of the FIG. 1 assembly are sealed to ceramic members 15 and 16 by any known wet soldering or brazing technique such as, for example, that disclosed in U.S. Patent 2,570,248—Kelley, at their abutting surfaces following evacuation of chamber 17 and "bake-out," as is well-known in the electronic tube art. Electrical connections may be provided for anode 11, grid 13 and cathode 12 in any suitable known manner, the exposed surfaces of these parts being employed for this purpose.

Referring to FIG. 2, contraction in centimeters per centimeter $\times 10^{+6}$ is plotted against temperature in degrees C. for sponge titanium metal, magnesia and magnesia-alumina spinel, all in substantially pure form, and for three magnesia and magnesia-spinel ceramics contemplated by this invention. Thus, curve I represents the contraction characteristics of sponge titanium and also the 50—50 spinel-magnesia composition, while curves II and III represent two ceramic compositions near the upper and lower limits, respectively, of the compositional range set out above and in the appended claims. Curve IV represents linear contraction characteristics of magnesia, and curve V represents these characteristics for magnesia-alumina spinel.

In view of the large difference between the expansion coefficients of magnesia-alumina spinel and magnesia (curves IV and V), it is surprising that composites of these materials can be produced which will maintain their integrity over the full operating range despite the thermal microstresses. While neither magnesia alone nor spinel alone can be successfully employed in combination with titanium metal parts for the purposes here contemplated, composites of this invention representing extremes of thermal expansion coefficient values can be used over prolonged periods of time and through a number of heating and cooling cycles without showing any tendency toward cracking or breaking or otherwise indicating the existence of thermal expansion and contraction stresses.

The density of the ceramic portions of these composite bodies has not been found to be highly critical but it is desirable that they be vacuum-tight. Vacuum tightness can be obtained at densities over 96 or 97 percent of theoretical density in the finished fired ceramic bodies and, on the other hand, I have found that bodies having a density greater than 99 percent of theoretical may be inferior in terms of vacuum tightness. In other words, porosity is not damaging to the vacuum-tightness characteristic so long as the pores do not connect all the way through the ceramic body so that a substantial gas pressure differential through the ceramic body cannot be maintained under conditions of operation of the vacuum tube or other device in which the composite structure is employed.

The following illustrative, but not limiting, examples are offered to further apprise those skilled in the art of the present invention and particularly the procedures by which the novel composite bodies hereof may be produced.

*Example I*

Spinel powder was prepared from Linde A alumina and Mallinckrodt SL-grade magnesia by dry-mixing these materials in powder form in the stoichiometric ratio of 100 grams of alumina and 40 grams of magnesia. The resulting mixture was pressed with sufficient moisture present to product green compacts or pellets which were then heated in air at 1500° C. for two hours. The resulting fired pellets were crushed and screened and the minus 60 mesh particles were wet ball-milled, dried and screened again. The minus 60 mesh spinel fines thus obtained were mixed in a Waring blender with magnesia in equal weight (60 grams of each being used) and with 100 cubic centimeters of alcohol. The resulting slurry was then dried and screened and the crystal size of the resulting product was observed to be a few microns. The magnesia used was obtained by calcining Mallinckrodt SL-grade magnesium carbonate at 1000° C.

The mixed spinel-magnesia powder was then compacted isostatically to obtain the maximum homogeneity. This was accomplished by loading the powder into three-quarter inch diameter rubber surgical tubing supported by a wooden block several inches long and uniformly settling the powder by gentle vibration prior to closing the tube with a heavy rubber plug. The vessel was then evacuated through a hypodermic needle inserted through the plug so as to pre-set the powder cylinder and minimize the amount of air that could be trapped in the compact during pressing. The cylinder thus prepared was pressed in an oil-filled chamber at a pressure of 40,000 p.s.i. and thereafter removed from the chamber and washed. After the rubber coating was stripped off, the resulting slugs were sliced dry into pellets and the as-pressed densities of these pellets were measured with a mercury porosimeter and found to be 49 percent of the theoretical density which is presumed to be 3.59 grams per cubic centimeter.

These pellets were then disposed loosely in a closable hollow boat of the same material previously sintered and prior to closing the boat, the pellets were covered with the powder of the same composition. The boat was then placed in a gas-fired kiln and the flow of oxygen was maintained through the tube in which the boat was disposed throughout the entire heating and cooling cycle. The sintering temperature was maintained within 10° C. of 1800° C. and the sintering period of two hours. Examination of the resulting product revealed that the grains were approximately equiaxed and of an average size of about eight to ten microns. The density of this product was 3.57 grams per cubic centimeter. Also, in instances where these pellets were bonded to titanium parts to serve as electrodes, the bonding was readily accomplished by the patented technique referred to above and the bond proved to be vacuum-tight and the resulting composite body did not indicate any tendency to develop destructive stresses in periods of heating and cooling over the room temperature to 730° C. range.

*Example II*

In each run of a series of runs, the magnesia and magnesia-spinel composition prepared as described in Example I was placed in the one-half inch diameter axial bore of a three-inch diameter graphite cylinder fitted with opposed bore plungers or pistons in the form of graphite rods driven by a hydraulic press. In this vessel, the composition was hot pressed, power being supplied directly to the die from a surrounding induction coil energized by a 500 kc. oscillator. The charge in each instance was two grams of powder and a pressure of 5000 p.s.i. was applied thereto when the temperature reached 400 to 500° C. and was maintained until the end of the run. During each run, the temperature was raised to the range of 1400 to 1600° C. in about 50 minutes and was held at the maximum temperature for 15 minutes. The density of the ceramic specimens prepared in this was 3.57 grams per cubic centimeter.

The specimens were subsequently heated in air at 1200 to 1500° C. to restore their white appearance, being discolored upon removal from the die, partly as a result of the adhering graphitic surface layer and partly because of a partial reduction due to carbon monoxide being present in small amounts in the die cavity during firing. This final heat treatment step resulted in each case in a small loss in density but it did not destroy the vacuum tightness of the specimens. However, it was observed that these specimens under some conditions showed the effects of inhomogeneous flow during pressing, there being on sections dark streaks, convexed toward their centers in some instances. The thermal expansion coefficient of these specimens closely approximated $10.0 \times 10^{-6}$ centimeter per cubic centimeter per degree C. and thus they virtually exactly matched titanium in this respect.

These specimens in the form of disks were cut into inner and outer washers and sealed to titanium disks in each case by heating under vacuum to about 1000° C. as described above. Absolute vacuum tightness was not obtained in all instances but success was realized in some cases and a vacuum-tight bond was obtained and maintained and the composite structure maintained its integrity under tests simulating actual operating conditions.

*Example III*

Test pellets of magnesia and magnesia-spinel were prepared in another operation like that of Example I except that the ratio of magnesia to magnesia-spinal was 40 parts to 60 parts, respectively. Under tests as described in Example I, substantially the same results were obtained as in the earlier case and bonding of these test pellets to titanium disks was successful.

*Example IV*

In still another operation, the ratio of magnesia to magnesia-spinel was 60 parts to 40 parts, respectively. The procedure employed was that described in Example II and the best results obtained were closely similar to those reported in Example II.

Wherever in the specification and in the appended claims parts, proportions or percentages are stated, reference is to the weight basis unless otherwise specifically stated.

Composite bodies generally similar to those disclosed and claimed in my copending application filed of even tantium dioxide for special additional advantages and characteristics, and a new method for producing such bodies as well as those of this invention, are disclosed and claimed in my copending application filed of even date herewith and entitled, "Titanium Ceramic Composite Bodies and Process," and assigned to the assignee of the present invention.

Having thus described this invention in such full, clear, concise and exact terms as to enable any person skilled in the art to which it pertains to make and use the same, I state that the subject matter which I regard as being my invention is particularly pointed out and distinctly claimed in what is claimed, it being understood that equivalents or modifications of, or substitutions for, parts of the specifically-described embodiments of the invention may be made without departing from the scope of the invention as set forth in what is claimed.

What I claim as new and desire to secure by Letters Patent of the United States is:

1. A composite body comprising at least one body of substantially pure titanium permanently joined to a crystalline ceramic body by means of a solder joint to form a vacuum-tight bond, the ceramic body consisting essentially of a fired mixture of magnesia and magnesia-alumina spinel having compositional limits between 40 and 60 parts of magnesia and between 60 and 40 parts of magnesia-alumina spinel, respectively, the ceramic body being substantially silica-free and having a coefficient of thermal expansion between 25° C. and 1000° C. of about $9.0 \times 10^{-6}$ centimeter per centimeter per degree C. to about $11.0 \times 10^{-6}$ centimeter per centimeter per degree C.

2. A composite body comprising at least one body of substantially pure titanium permanently joined to a crystaline ceramic body by means of a solder joint to form a vacuum-tight bond, the ceramic body consisting essentially of a fired mixture of magnesia and magnesia-alumina spinel containing 50 parts of magnesia and 50 parts of magnesia-alumina spinel, the ceramic body being substantially silica-free and having a coefficient of thermal expansion between 25° C. and 1000° C. of $10.0 \times 10^{-6}$ centimeter per centimeter per degree C.

References Cited in the file of this patent

UNITED STATES PATENTS

| | | |
|---|---|---|
| 2,857,663 | Beggs | Oct. 28, 1958 |
| 2,962,136 | Pincus | Nov. 29, 1960 |